(No Model.)
N. L. HIGGINS.
WAGON RUNNING GEAR.
No. 282,637. Patented Aug. 7, 1883.
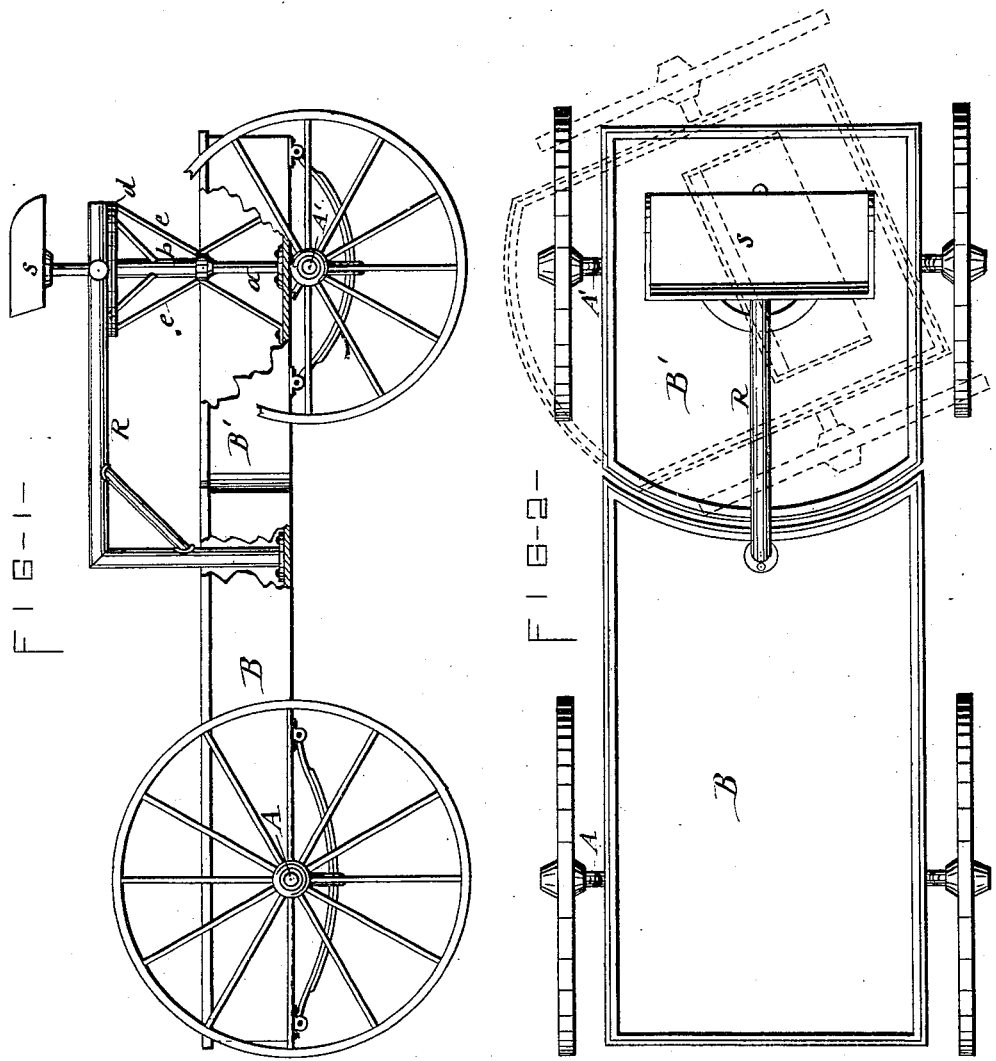
WITNESSES —
Wm C. Raymond
J. H. Gibbs
INVENTOR —
Norman L. Higgins
per Duell, Laass & Hey
his Attys

UNITED STATES PATENT OFFICE.

NORMAN L. HIGGINS, OF ELMIRA, NEW YORK.

WAGON RUNNING-GEAR.

SPECIFICATION forming part of Letters Patent No. 282,637, dated August 7, 1883.

Application filed May 8, 1883. (No model.)

*To all whom it may concern:*

Be it known that I, NORMAN L. HIGGINS, of Elmira, in the county of Chemung, in the State of New York, have invented new and useful Improvements in Vehicles, of which the following, taken in connection with the accompanying drawings, is a full, clear, and exact description.

The object of this invention is to provide a four-wheeled vehicle which shall carry the body or box as low as may be desired for convenience of loading and unloading; also may be provided with large forward wheels, and thus run easier than ordinary vehicles, and yet admit of turning the vehicle at most any angle and within its own length; and to that end my invention consists, chiefly, in dividing the vehicle-body transversely into two parts or sections, mounted, respectively, on the two axles of the vehicle, and suitably connected to afford the necessary lateral movement to the said vehicle, all as hereinafter more fully explained, and set forth in the claims.

In the accompanying drawings, Figure 1 is a side view of my improved vehicle; and Fig. 2 is a plan view of the same, the dotted lines illustrating its capability of turning abrupt angles.

Similar letters of reference indicate corresponding parts.

A and A' denote the hind and forward axles, respectively, of a vehicle; and B and B', the two bodies or sections of a transversely-divided body, mounted, respectively, on the aforesaid axles, and supported either directly on the same or on suitable springs. Each of the aforesaid body-sections B B' is so secured in its position as to compel it to turn laterally with the axle which supports it. The line of separation of said sections I prefer to make curvilinear, concentric with the king-bolt $a$, and of a radius as great or greater than that of the radial sweep of the forward running-gear, so that the forward wheels may travel across the front of the rear body-section, B, as represented by dotted lines in the annexed drawings, thus allowing the forward section of the vehicle to be turned at right angles to the rear section thereof.

It will be observed that by so turning the forward running-gear the forward section, B', of the body is swung around with it, so as to present the rear end of the said body-section at the side of the vehicle, and thus render the same more readily accessible for loading or unloading.

In order to admit of the use of large forward wheels, and thus cause the vehicle to run easier than ordinary vehicles, I couple the two vehicle-sections by an elevated reach, R, which rises from the rear section to a sufficient height to carry clear of the forward wheels the forward extension of the reach, which latter is connected to the king-bolt $a$ in the following manner: The king-bolt rises above the body and is rigidly secured in its position. To the reach is firmly attached a downward-projecting tube or sleeve, $b$, through which the king-bolt passes. The king-bolt and sleeve are both properly braced, as shown in the drawings. The fifth-wheel $d$ is supported on braces $e\ e$, and the top ring thereof is firmly secured to the reach in any suitable and well-known manner. The king-bolt projects somewhat above the reach, and to the protruding end thereof is secured the driver's seat $s$, which may be either pivoted thereon or rigidly attached, as may be desired, the main object being to allow the seat to turn with the forward section of the vehicle, and thus permit the driver to face the direction in which the team is standing.

Having described my invention, what I claim as new, and desire to secure by Letters Patent, is—
1. A wagon composed of forward and rear running-gears, two separate and distinct bodies or boxes mounted, respectively, on said running-gears or on the axles, and an elevated reach connecting the rear section of the wagon with the forward section of the same above the forward body, substantially as and for the purpose shown and set forth.

2. In combination with the forward and rear running-gears, two bodies fixed one to each of said running-gears or the axles, a rigid king-bolt rising above the forward body, a reach passing over the top of said body and connected with the king-bolt, and a seat fixed to the king-bolt to turn therewith, substantially as described and shown.

In testimony whereof I have hereunto signed my name and affixed my seal, in the presence of two attesting witnesses, at Syracuse, in the county of Onondaga, in the State of New York, this 3d day of May, 1883.

NORMAN L. HIGGINS. [L. S.]

Witnesses:
 FREDERICK H. GIBBS,
 WM. C. RAYMOND.